Dec. 12, 1967　　　MASAMITSU KAWAKAMI　　　3,358,249
FOLDED H-SHAPED RESONATOR ELECTROMECHANICAL FILTER
Filed Oct. 23, 1964　　　　　　　　　　　　　　　4 Sheets-Sheet 1

United States Patent Office 3,358,249
Patented Dec. 12, 1967

3,358,249
FOLDED H-SHAPED RESONATOR ELECTRO-
MECHANICAL FILTER
Masamitsu Kawakami, Tokyo-to, Japan, assignor to Toko Kabushiki Kaisha, Tokyo-to, Japan, a joint-stock company of Japan
Filed Oct. 23, 1964, Ser. No. 407,274
Claims priority, application Japan, Aug. 22, 1961, 36/30,558; Aug. 27, 1961, 36/43,662; Feb. 27, 1962, 37/6,907
4 Claims. (Cl. 333—71)

ABSTRACT OF THE DISCLOSURE

A folded temperature compensated bandpass electromechanical filter using H shaped resonator elements of opposite temperature coefficients with the electrostrictive transducers bonded directly to the end resonator elements.

This application is a continuation-in-part of my co-pending application Ser. No. 181,389, now abandoned.

The invention relates to electromechanical filters, and more particularly to a new electromechanical filter, wherein electric signal energy is converted into mechanical vibration energy with an electrostrictive transducer, then said vibration energy is transmitted through a mechanical resonator system, and vibrations other than those of the desired frequency band are damped, after which only the vibration energy of the desired frequency band is again converted into an electric signal energy with an output transducer.

Conventional electromechanical filters of this type, in general, consist of a resonator system consisting substantially of resonators of high Q and a series of couplers, and are provided at both ends thereof with transducers such as magnetostrictive elements, electrostrictive elements or piezo-electric elements, for converting electrical energy into mechanical energy or the reverse. Electromechanical filters of this type have excellent attenuation characteristics. On the other hand, however, such factors as the dimensional precision of the resonator system, small differences in weight, and temperature coefficients of materials have critical influences on the natural resonant frequency of the resonator system, wherefore, in order to obtain the desired wave filtering characteristics, a rigid standard of precision is required in the fabrication of the product. Accordingly, such electromechanical filters have various disadvantages such as extreme difficulties in manufacture and high production cost.

It is, therefore, a principal object of the present invention to provide a new electromechanical filter which is easily manufactured and is suitable for mass-production, and which can be produced to sell at a low price.

It is another object of the invention to provide a electro-mechanical filter having an excellent temperature characteristic such that the temperature coefficient of the entire resonator system can be made to approach zero, that is, the filtering characteristic is not affected by temperature variations.

It is a further object of the invention to provide a high-performance band-pass filter which, due to simplified construction, can be miniaturized to an extreme degree so as to contribute to the microminiaturization of electronic equipment.

The nature of the invention, its details, as well as the manner in which the foregoing objects may best be achieved will be more clearly apparent by reference to the following description when taken in conjunction with the accompanying drawings in which like parts are designated by like reference numerals or letters, and in which.

Figure 5:
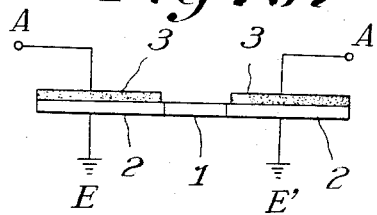
FIG. 5 is a side view, in diagrammatic form, indicating the simplest embodiment of the electromechanical filter according to the invention.
Figure 10:
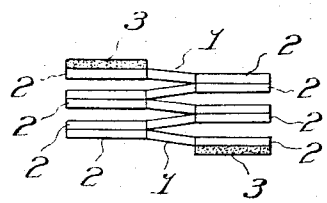
Figure 15:
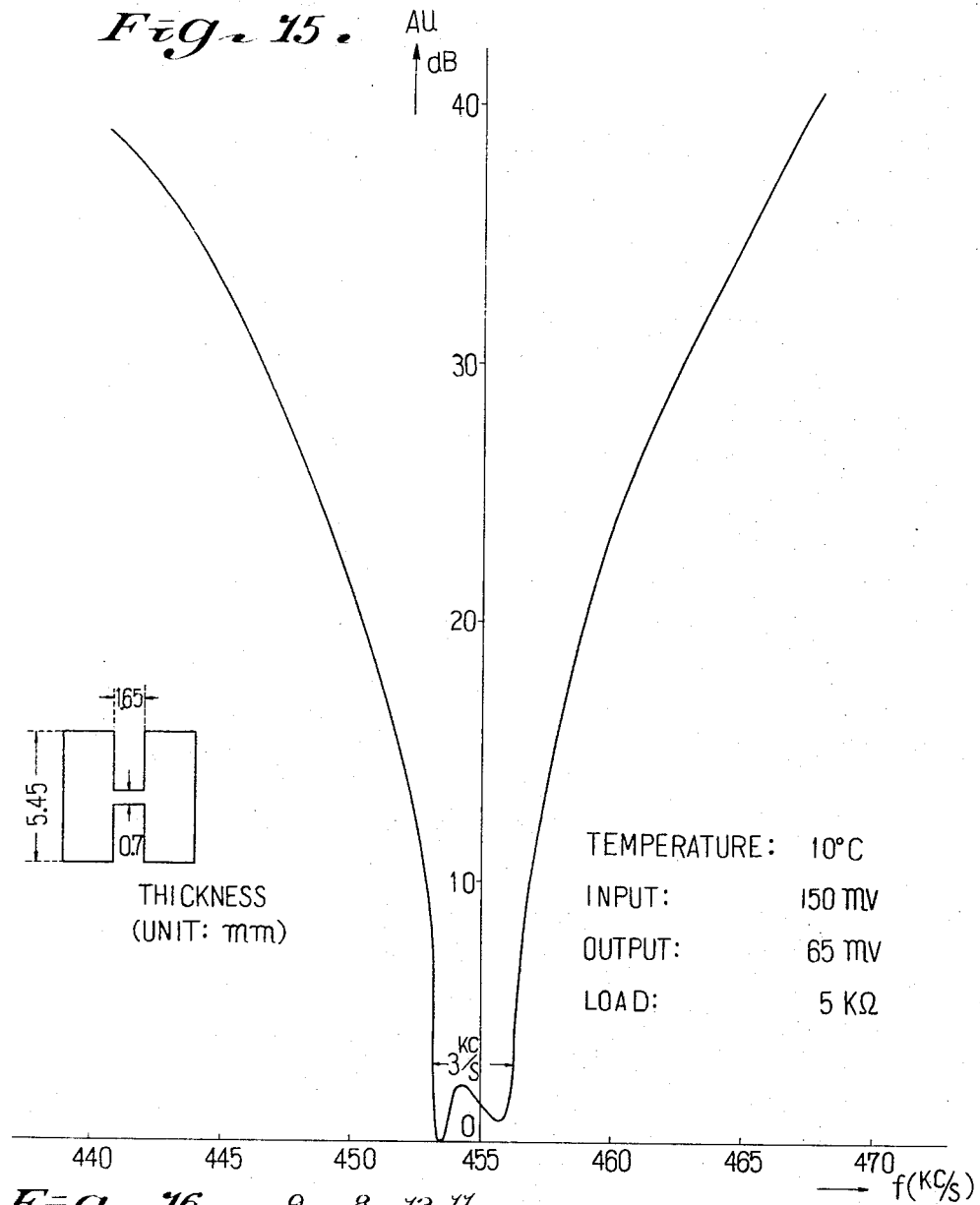
Figure 16:
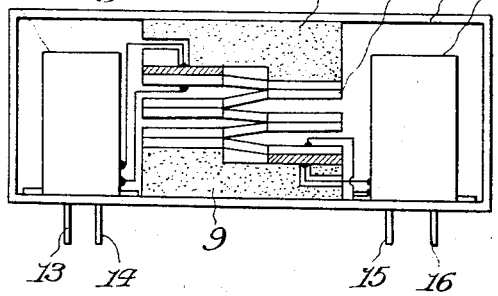

FIG. 15 is a graphical representation indicating measured values of amplitude characteristic obtained when electromechanical filter of the simplest construction indicated in FIG. 5 is actually driven; and FIG. 16 is a side elevational view, partly in section and with parts cut away, showing, in outline form, an assembly of the embodiment of the invention illustrated in FIG. 10 together with accessory devices.

Figure 1:
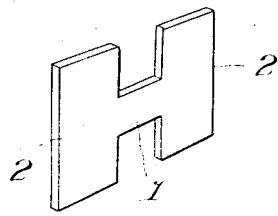
FIG. 1 is a perspective view showing one unit of a coupled resonator.
Figure 2:
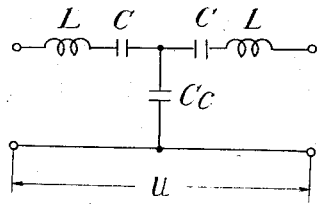
FIG. 2 is an electrical connection diagram indicating the equivalent circuit of the coupled resonator of FIG. 1.

The resonator shown in FIG. 1 consists of a metal plate cut into an H shape, wherein resonator plates 2 at both ends, which are the principal resonators, are coupled at the center by a coupler 1. This vibration system is indicated by the equivalent circuit of FIG. 2. That is, in FIG. 2, reference letters L and C designate, respectively, an equivalent inductance and an equivalent capacitance of the resonator plates 2; and reference letter Cc designates a capacitance equivalent of the coupler 1.

Figure 3:
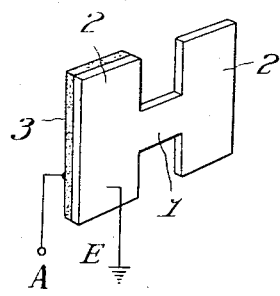
FIG. 3 is a perspective view showing a driving resonator.

The driving resonator shown in FIG. 3 consists of a resonator such as that of FIG. 1 with a polarized electrostrictive material 3 bonded to one surface of one of the resonator plates 2, and with electrodes A and E provided on opposite sides of the lamination of the electrostrictive material 3 and the resonator plate 2. The resonator is driven electrostatically. When the resonator is made from a metal plate, the resonator itself is used as the electrode E.

The present invention differs from electromechanical filters of prior art, for example, Pat. No. 3,064,213 (Mason) in that the electrostrictive transducers are bonded directly to the main resonating elements and not to intermediate sections. The present invention also differs from electromechanical filters of the piezoelectric type, for example, Pat. No. 3,015,789 (Honda) wherein a single piece of piezoelectric material is employed, such as quartz crystal, whose properties are utilized for the resonating elements and as transducers for electric energy. The piezoelectric type filters have the disadvantage that the base material is very fragile and requires extreme care in processing and mounting.

According to the present invention, the electrostrictive material 3 is bonded to each of the input and output ends of a resonator system as transducer and electrostatically driven at the input. Accordingly, since the use of a separate transducer element, as in the case of a conventional resonator, is unnecessary, the resonator of this invention is advantageous for simplification in the manufacture and miniaturization of the product.

Figure 4:
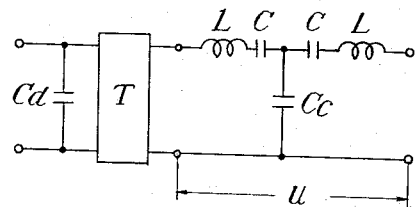
FIG. 4 is an electrical connection diagram indicating the equivalent circuit of resonator of FIG. 3.

The equivalent circuit of the resonator of FIG. 3, as shown in FIG. 4, consists of the equivalent circuit $u$ of the resonator of FIG. 1 and a damping capacitance $Cd$ of a transducer T of the electrostrictive material 3 which are connected on one side of said circuit $u$.

Figure 6:
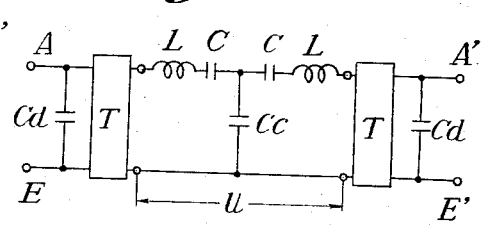
FIG. 6 is an electrical connection diagram indicating the equivalent circuit of the filter of FIG. 5.

The simplest form of the filter of this invention is indicated in FIG. 5. This filter is composed of a single resonator unit shown in FIG. 1 with an electrostrictive material 3 similar to that shown in FIG. 3 bonded to each of the resonating plates 2, one side to be used as the input end, and the other side to be used as the output side. With this simple construction, a performance equal to that of a conventional double-tuned band-pass filter can be obtained, as indicated by the equivalent circuit shown in FIG. 6. The reference designations of FIG. 6 are in conformance with those of FIGS. 2 and 4.

Figure 7:
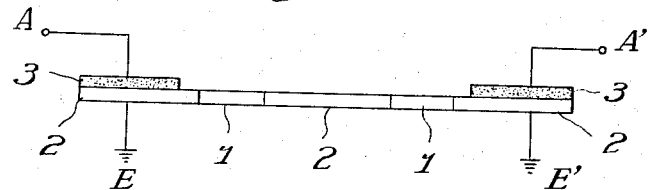
FIG. 7 is a side view of another embodiment of this invention, in diagrammatic form, indicating a multi-unit bandpass filter constructed in a single block.
Figure 8:
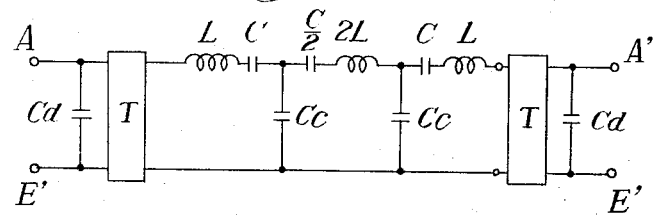
FIG. 8 is an electrical connection diagram indicating the equivalent circuit of the filter of FIG. 7.

FIG. 7 illustrates a band-pass filter wherein two couplers 1 and three resonator plates 2 such as those shown in FIG. 1 are formed in series as a single block, and two electrostrictive materials 3 are, respectively, bonded to input and output resonator plates 2. By the use of such an arrangement, a miniature band-pass filter of any high order can be realized. The equivalent circuit of the filter of FIG. 7 is shown in FIG. 8.

Figure 9:
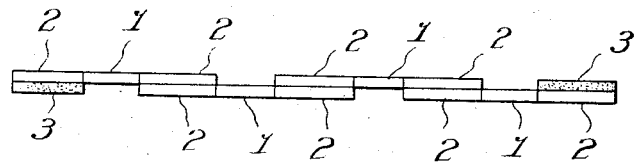
FIGS. 9, 10 and 11 are side views showing examples of an embodiment wherein a band-pass filter is constructed by connecting in cascade arrangement a plurality of double-tuned couplers such as that shown in FIG. 1.
Figure 11:
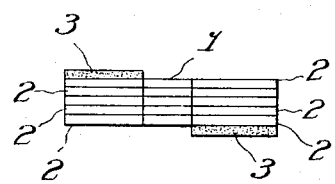
Figure 12:
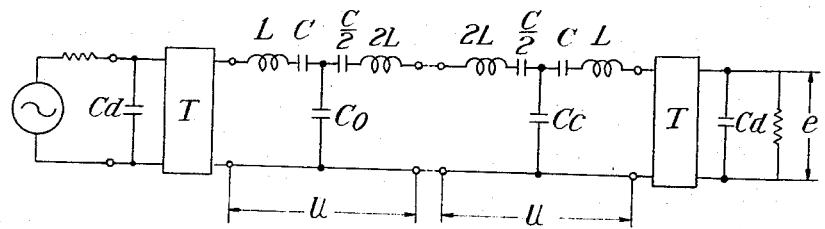
FIG. 12 is an electrical connection diagram indicating the equivalent circuit of the filters illustrated in FIGS. 9, 10 and 11.

FIGS. 9, 10 and 11 in which couplers, resonator plates and a electrostrictive bodies are, respectively, designated by 1, 2, and 3, illustrate modifications of an embodiment of the invention wherein a plurality of double-tuned resonators as shown in FIG. 1 are connected successively in cascade arrangement by mutually bonding each resonator plate 2 to one of the resonator plates of the adjacent resonator. A case wherein the resonators are simply connected in a row is shown in FIG. 9. A case wherein only the couplers 1 are slightly bent askew, in a joggled manner, and the mutually opposite surfaces of the two resonator plates 2 of each resonator plate of the adjacent resonators to form a tiered zigzag connection is shown in FIG. 10. A case wherein the arrangement of FIG. 10 is compressed in an extreme manner is shown in FIG. 11. In all of these cases, the resonators are connected in cascade arrangement, and a electrostrictive material 3, similar to that described above, is bonded to each of the input and output ends of each arrangement. The equivalent circuit which is common to all of these cases is, as indicated in FIG. 12, exactly equivalent to that in the case of a conventional band-pass filter.

When a band-pass filter is constructed as described above, by connecting in cascade a plurality of double tuned resonators, it is necessary merely to inspect each H-shaped resonator unit, differing from the case wherein a filter is composed of resonators and couplers arranged in an iterative chain in a single block. Therefore, the precision of such quantities as dimensions and weights of the resonators can be easily maintained, and the filter as described above is highly effective for obtaining uniformity of product and for facilitating manufacture. Furthermore, since it is possible also to use combinations of H-shaped resonator units having different signs of temperature coefficient, the temperature coefficient of the entire resonator system can be easily made to approach zero by suitably selecting the materials for all the units. Accordingly, a band-pass filter of desired temperature characteristics can be obtained.

For example, by welding one unit having a temperature coefficient of (−25 p.p.m.) to another having a temperature coefficient of (+20 p.p.m.), a unit is obtained having a temperature coefficient of approximately (−5 p.p.m.). When an element of a temperature coefficient of approximately (+200 p.p.m.) such as barium titanate is used as the electrostrictive material, and a metal of a temperature coefficient of approximately (−30 p.p.m.), e.g. of the Elinvar group, is used as the resonator, it is possible to obtain a temperature coefficient of approximately (+20 to +50 p.p.m.) by suitable selection of the thickness of both elements. This is particularly true for the embodiments according to FIGS. 5 and 7, respectively. The Elinvar group comprises Elinvar (52 Fe, Ni 36, Cr 12) and co-Elinvar (16 Ni, 10 Cr, 36 Co, Fe) alloys which are characterized by extremely low coefficients of expansion and change in the Young's Modulus with respect to changes in temperature.

By connecting the resonator units in zigzag form as shown in FIGS. 10 and 11, it is also possible to provide a high-performance band-pass filter, the entire volume of which is miniaturized to an extreme degree, occupying a space about 6 mm. square and a height depending on the number of resonator plates which are less than 1 mm. thick for a typical 455 kc. unit.

Some examples of practical uses of the filter of this invention will now be described in conjunction with FIGS. 13 and 14.

Figure 13:
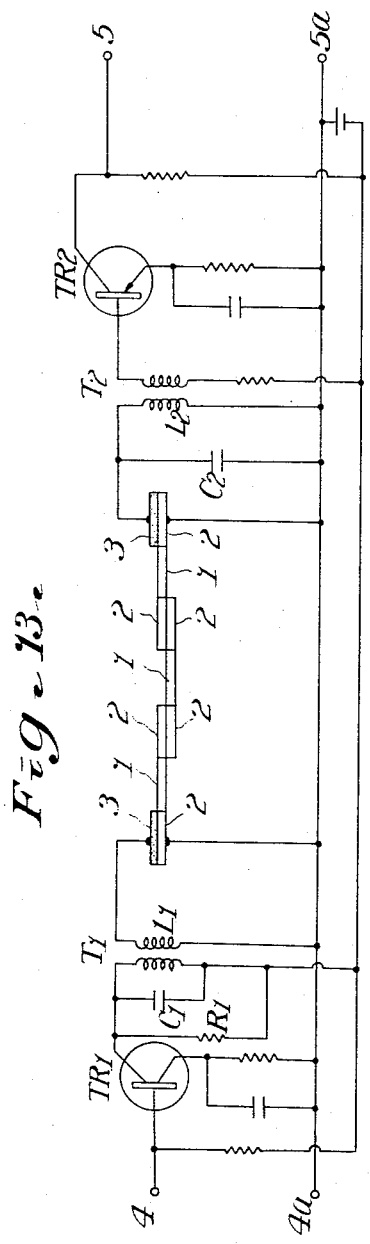
FIG. 13 is an electrical connection diagram indicating a circuit in the case wherein an embodiment of the electromechanical filter according to the invention is inserted between transistors.

In FIG. 13, transformer $T_1$ of the input is a matching transformer. The transformer $T_2$ of the output circuit is a transformer for matching the base input resistance of the transistors $TR_2$ of the following stage and the output resistance of the following stage and the output resistance of the filter. Each of these transformers $T_1$ and $T_2$ are composed of independent primary and secondary windings, or it may be an autotransformer with taps. Furthermore, depending on the application, the capacitor $C_1$ and resistor $R_1$ of the input may be connected to the secondary side of the transformer $T_1$, and the capacitor $C_2$ of the output may be connected to the secondary side of the transformer $T_2$.

Figure 14:
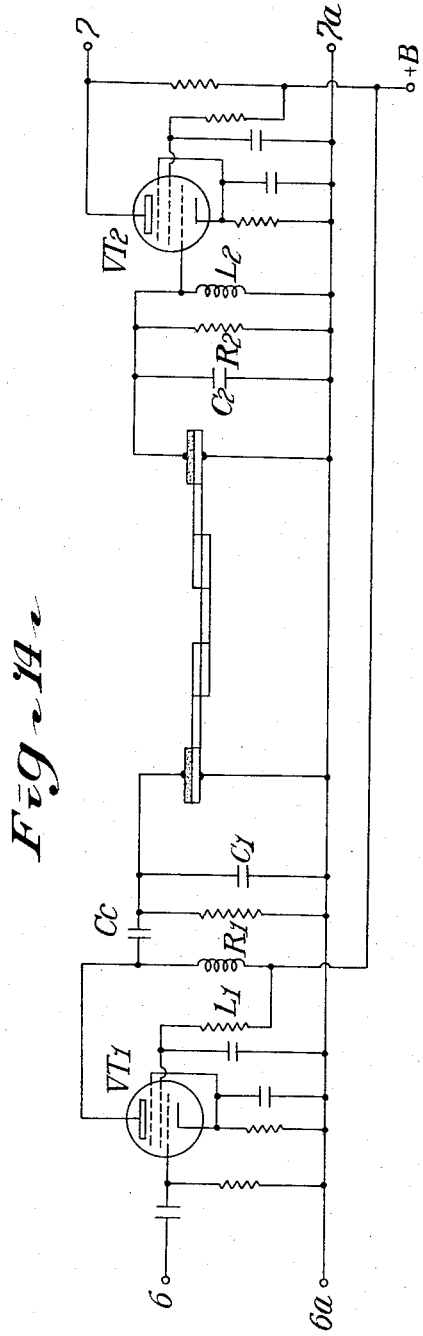
FIG. 14 is an electrical connection diagram indicating a circuit in the case wherein an embodiment of the electromechanical filter according to the invention is inserted between vacuum tubes.

In the vacuum tube circuit of FIG. 14, the capacitor $C_1$ at the filter input is in parallel with the capacitor $Cd$ of the circuit shown in FIG. 4, and the values of the capacitance $(C_1+Cd)$ and the inductance $L_1$ are so selected that antiresonance occurs at the required center frequency of the filter. The resistor $R_1$ is the input resistance, and the capacitor $Cc$ is for the purpose of blocking out the direct current potential.

The capacitor $C_2$ at the output is connected in parallel with the capacitor $Cd$ at the output shown in FIG. 8, and the values of the capacitance $(C_2+Cd)$ and the inductance $L_2$ are so selected that antiresonance occurs at the required center frequency of the filter. The resistor $R_2$ is the output resistance.

The circuit diagram of FIG. 14 indicates an example in which matching transformers are not used at the input and output. However, the input and output circuits which include transformers as indicated in FIG. 13 may be connected when there are large mismatches.

FIG. 15 graphically represents measured values of the response of the filter of this invention in its simplest form as illustrated in FIG. 5 when it was actually operated. These measured values were obtained with a filter of the dimensions shown, with 5 KΩ load resistances connected to the input and output sides of the circuit, with an input of 150 mv. In this case, an output voltage of 65 mv. was obtained at a maximum.

In the assembly shown in FIG. 16, a filter 8 which is similar to that shown in FIG. 10 is supported between a supporting material 9, for example, sponge rubber, yet does not absorb kinetic energy. The input and output of the filter 8 are connected, respectively, to component assemblies 10 and 11 which contain coils, capacitor, and input and output resistances, which are the electrical elements of the input and output. Depending on the application, the capacitors and input and output resistors may be removed so as to be connectable externally. The above-described assembly is enclosed within an enclosure 12 and provided with input terminals 13 and 14 and output terminals 15 and 16.

Since it is obvious that many changes and modifications can be made in the above-described details without departing from the nature and spirit of the invention, it is to be understood that the invention is not to be limited to the details described herein except as set forth in the appended claims.

What is claimed is:

1. A band-pass electromechanical filter comprising, in assembled combination, a resonator system consisting of a plurality of double tuned resonators of similar kind, each of which is formed from a single piece made of one kind of metal plate in the configuration of the letter H having two resonator plates coupled by a transverse coupler which is bent askew in a joggled manner so as to dispose the said two resonator plates in different but mutually parallel planes, the said H-shaped resonators being cascade-connected in a tiered zigzag arrangement wherein adjacent H-shaped resonators are joined by the laminar bonding of their respective said resonator plates which are mutually nearmost and mutually confronting, a piece made of one kind of electrostrictive material bonded to one surface of each of the free resonator plates at the two ends of the said resonator system, and electrodes connected to opposite points on the two surfaces of each said piece, the said resonator system being electrostatically driven with one end thereof as the input end and the other end as the output end.

2. The electromechanical filter as defined in claim 1, wherein each resonator plate to which a piece of electrostrictive material is bonded is used as one of the two electrodes holding said piece therebetween.

3. A band-pass electromechanical filter as defined in claim 2 wherein, by diminishing to an extreme degree the angle through which said coupler is bent askew in a joggled manner, the said resonator system which is cascade-connected in a tiered zigzag arrangement is compressed in volume to an extreme degree.

4. A band-pass electromechanical filter comprising, in assembled combination, a resonator system consisting of a plurality of cascade-connected double tuned resonators, each of which is formed from a single piece made of one kind of metal plate in the configuration of the letter H having two resonator plates coupled by a transverse coupler, a piece made of one kind electrostrictive material bonded to one surface of each of the free resonator plates at the two ends of said resonator system, and electrodes connected to opposite points on the surface of each said piece, said resonator system being electrostatically driven with one end thereof serving as the input end and the other as the output end, said resonator system having a pass band narrower at the intermediate portions than the resonators at both terminals, said resonators being of mutually substantially opposite temperature coefficients thus attaining an aggregate of a temperature coefficient approaching zero.

References Cited

UNITED STATES PATENTS 2,695,357   11/1954   Donley _____ 333—72

ROY LAKE, *Primary Examiner.*

D. R. HOSTETTER, *Assistant Examiner.*